Nov. 15, 1938.　　　　H. A. ROSE　　　　2,137,063
AUTOMATIC DISCONNECT FOR RECTIFIERS
Filed Jan. 28, 1938　　　3 Sheets-Sheet 1
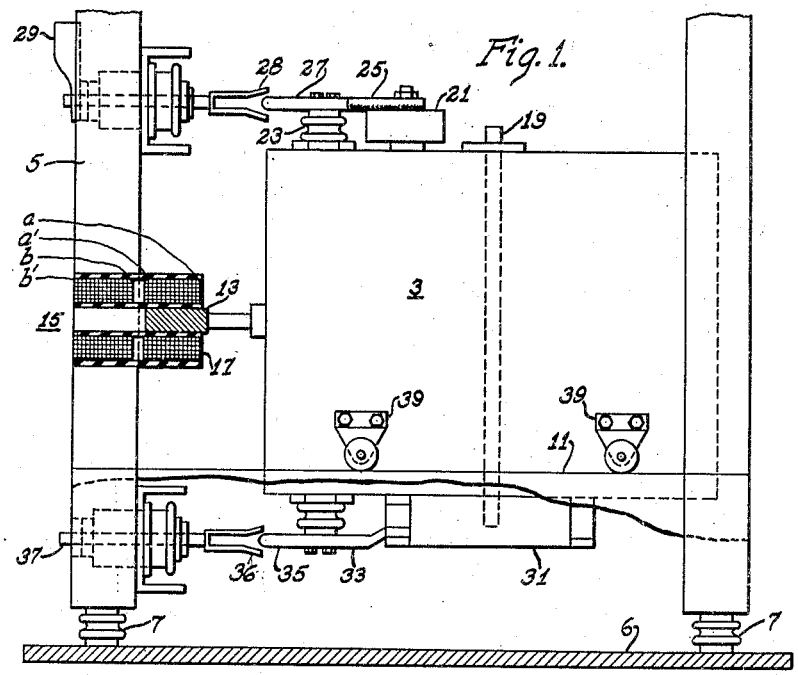
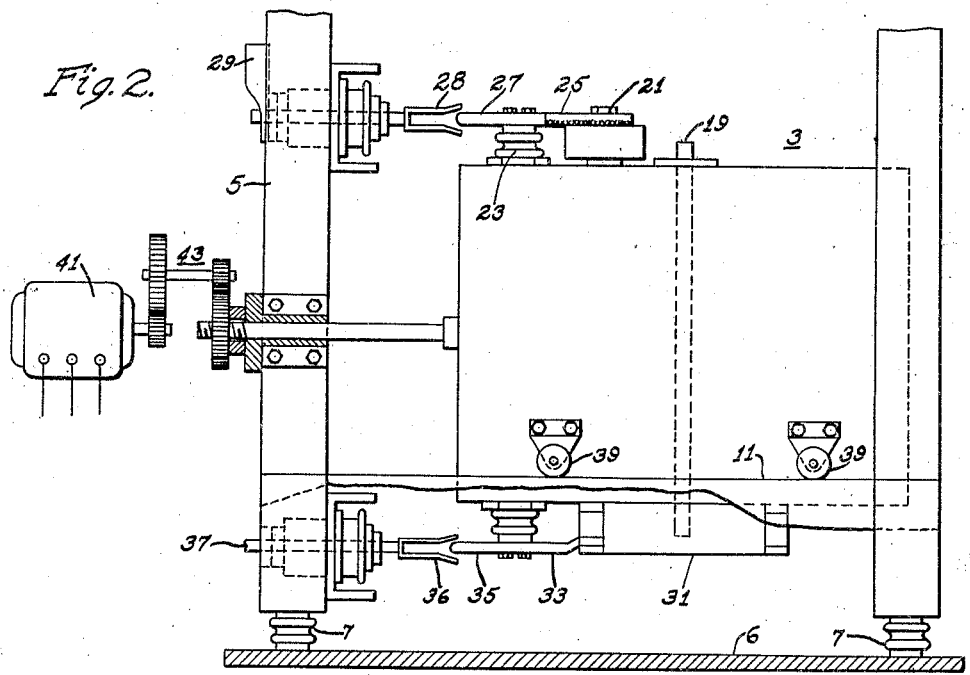
WITNESSES:
INVENTOR
Herbert A. Rose.
BY
ATTORNEY Nov. 15, 1938.　　　　H. A. ROSE　　　　2,137,063
AUTOMATIC DISCONNECT FOR RECTIFIERS
Filed Jan. 28, 1938　　　3 Sheets-Sheet 3

WITNESSES:
Leon M. Garman
J. Thomas Danko

INVENTOR
Herbert A. Rose.
BY O. B. Buchanan
ATTORNEY

Patented Nov. 15, 1938

2,137,063

UNITED STATES PATENT OFFICE 2,137,063

AUTOMATIC DISCONNECT FOR RECTIFIERS

Herbert A. Rose, Leonia, N. J., assignor to Westinghouse Electric & Manufacturing Company, East Pittsburgh, Pa., a corporation of Pennsylvania Application January 28, 1938, Serial No. 187,464

9 Claims. (Cl. 175—363)

My invention relates to sectionalized vapor-arc rectifiers and it has particular relation to automatically disconnecting any section of such rectifiers from service upon indication of any abnormal operating conditions.

In the operation of sectionalized vapor-arc rectifiers, each section of the rectifier is subjected to numerous faults, such as overload, backfire, failure of excitation, internal short circuits and faulty control. Consequently, when any section of the rectifier is subjected to any abnormal condition, it becomes desirable to remove the faulty section from service and to maintain the remaining sections of the rectifier active without disturbing the converting system. Heretofore, any section at fault was disconnected from its power circuit through operation of circuit breakers. In rectifier systems heretofore used, a circuit breaker is required for each anode. In a sectionalized rectifier consisting of four sections, each section having six anodes, the number of circuit breakers would add greatly to the cost.

This limitation, among others, is eliminated in accordance with my invention. I provide for a protective system of construction whereby any section of the converter upon being subjected to any abnormal operating condition would be automatically disconnected from service. The disconnecting system according to my invention comprises means for removing the faulty section from its normal operating position by a suitable control apparatus which would actuate a jacking-out solenoid or any suitable motor-driven means coupled with a section of the rectifier. Each section of the rectifier would be likewise provided with similar control devices and moving means.

It is, therefore, an object of my invention to provide for an automatic disconnecting means to remove a faulty section of a rectifier from its normal power circuits.

It is a further object of my invention to provide for a disconnecting system without disturbing the vacuum or cooling sytems of the rectifier.

It is another object of my invention to provide for a relay control system which would respond to abnormal operation of any section of the rectifier, thereby energizing my automatic disconnecting means.

Other objects of my invention will be apparent from the following detailed description, taken in conjunction with the accompanying drawings, in which:

Figure 1 is an elevational view partly in section of a portion of a sectionalized converter utilizing my disconnecting system;

Fig. 2 is a similar view showing a modification of my invention;

Figure 3:
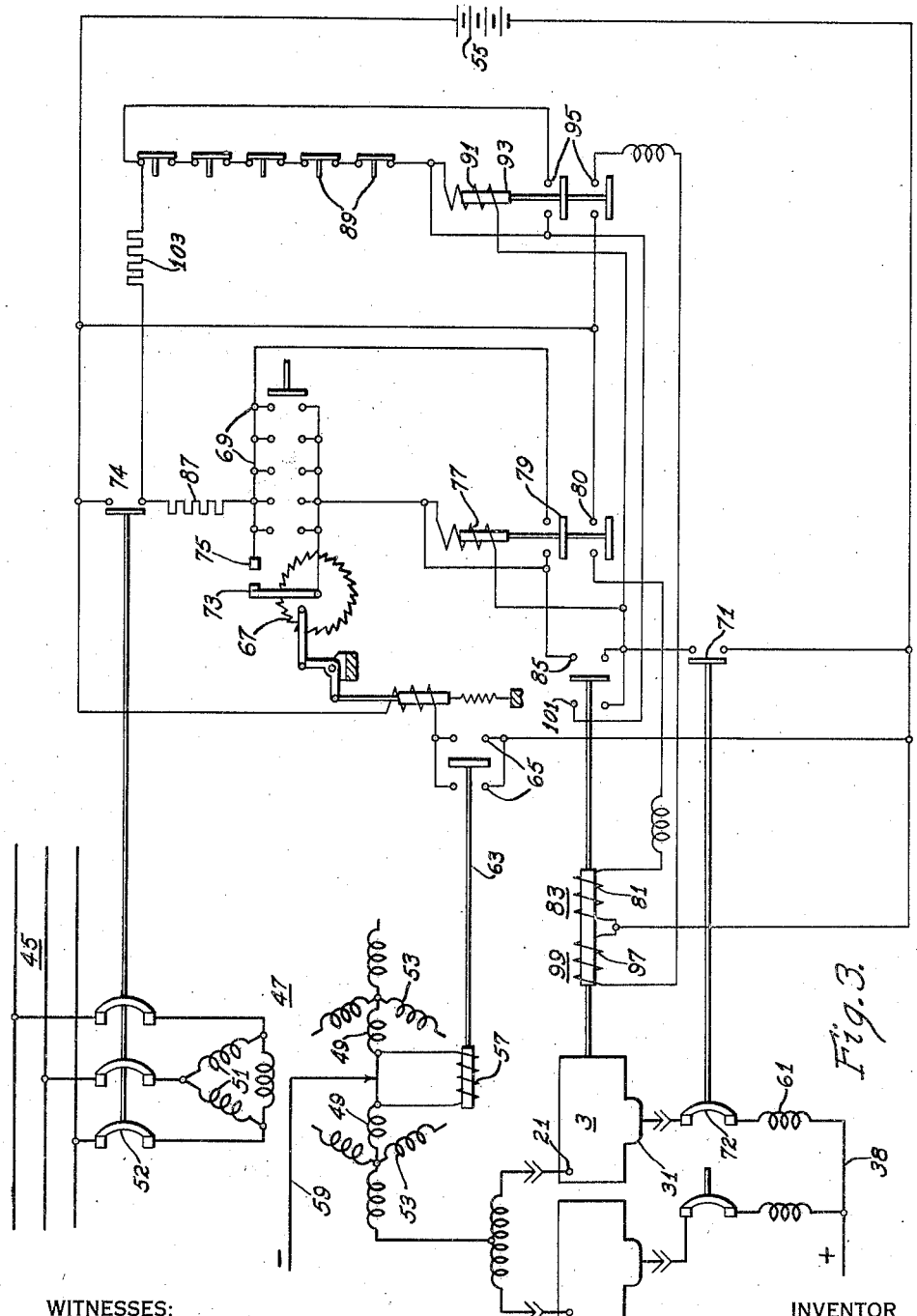
Fig. 3 is a schematic illustration of the circuits according to my invention; and, Fig. 4 is a similar view showing a modification thereof.

In order to simplify my explanation of the method of operation, I shall illustrate my invention by considering only one section 3 of a multiple section mercury-arc rectifier. Each of the sections 3 is a complete rectifier tank in itself, having six anodes and its own cooling and evacuating systems. It is to be understood that all sections of a sectionalized type of rectifier operate in a similar manner.

The apparatus, according to my invention, comprises a metal structure 5 preferably insulated from the ground 6 by suitable insulators 7. The mercury-arc tank 3 is supported on rails 11 and can be moved out of its operating position in response to proper indications. The movable element 13 of a jacking solenoid 15 is coupled to the tank 3. The stationary element 17 is mounted in the structural frame 5.

A starting anode 19 extends through the center of the rectifier tank 3. One of the six anodes 21 is shown in my diagram having a conductor 25 supported on the tank 3 by an insulator 23. The strap-connector 25 connects the terminal jack 27 of the anode 21 to its appropriate anode lead 29 through a connecting plug 28. In the normal position of a rectifier section 3, the end of the anode strap 25 is engaged with the anode connector plug 28 thereby maintaining the anode circuit closed. The cathode 31 likewise has a strap connector 33 connecting the terminal jack 35 of the cathode 31 to its proper cathode lead 37 by connecting plugs 36.

In my illustration, I provide a plurality of rollers 39 attached to, and insulated from, the tank proper. However, it is to be understood that the tank 3 may be moved not only side-ways but vertically as well, or it may be caused to slide on rails.

In Fig. 2, I show a modification of my invention. In this case, a suitable motor 41 provided with a suitable combination of gears 43 is indicated. An alternating current motor 41 is shown, although any type of motor may be used. A section 3 of the rectifier is moved in or out by a corresponding change in the direction of rotation of the motor 41. This is accomplished by reversing any two leads in the three phase motor supply system.

In Fig. 3, according to my invention, one section 3 of a sectionalized converter is connected to a three-phase alternating current supply line 45 by a transformer 47. Any suitable transformer 47 may be used, but I prefer to use a transformer 47 in order to divide the current between the sections 3, the mode of operation of the sections being controlled by means of a suitable interphase transformer 49. Transformer 47 has a delta-connected primary winding 51 and a star-connected double three phase secondary winding 53. A suitable circuit breaker 52 connects the alternating current supply line 45 with the converter. The cathode 31 of each section 3 is connected to the direct current output circuit 38 by means of a suitable high speed circuit breaker 72.

A suitable control potential for my converter may be obtained by some direct current source, such as a battery 55. Preferably, each section 3 of the sectionalized rectifier would receive its control potential from this source 55 in order to reduce equipment costs.

In case of an arc-back or an unbalanced current such as produced by internal short circuits, the unbalance in the interphase transformer 49 may be used for selective tripping of the rectifier unit. A suitable shunt 57 is connected between the two windings of the interphase transformer 49, with the negative lead 59 connected to the middle point of the shunt 57. Under normal operating conditions, the currents in the two halves of the shunt 57 are equal and opposite, so that the voltage drop across the shunt 57 is zero. Upon the occurrence of a reverse current or a backfire, the current in one winding of the interphase transformer 49 is reversed so that the magnetomotive forces in the several windings of the interphase transformer 49 become additive thereby energizing the shunt coil 57 which causes its plunger 63 to move out, closing its contacts 65. Due to the fact that the abnormal condition still continues in the rectifier, a condition equivalent to a short circuit on the transformer secondary 53 and on the direction circuit 38 it is essential to disconnect the alternating current circuit breaker 52 as well as the direct current breaker 72. The short-circuit current flowing through the transformer secondary 53 trips the alternative current breaker 52 from the supply circuit 45, closing its back contact 74 while the reverse current flowing from the direct current system 38 through the cathode 31 energizes the reverse current trip coil 61 tripping the circuit breaker 72, closing its back contacts 71.

A suitable counting indicator 67 is provided having a plurality of abnormal condition checking contacts 69. Upon the occurrence of an arc-back, the contact arm 73 fastened to the indicator 67 moves a notch ahead. It is to be understood that the indicator 67 may be set for any number of notches, each recording an arc-back. For example, if the indicator 67 is set for $n$ number of arc-backs, the contact arm 73 reaches its cooperating contact 75 upon the occurrence of $n$ arc-backs. When this condition arises, the coil of the solenoid 77 is energized, which, in turn, closes its contacts 79 and 80 locking itself in and energizing the operating coil 81 of the jacking-out solenoid 83 which jacks out the section 3 until its back contacts 85 close and deenergize the operating solenoid 77.

The jacking-out solenoid 83 thus pulls out a faulty section 3 of the rectifier from its operating position thereby disconnecting the circuits through disconnecting plugs 28 and 36. A resistor 87 is placed in series with the circuit of the operating coil of the solenoid 77 to limit the short circuit current while the limit switch 85 is closed.

If the fault is cleared and all abnormal condition checking contacts 69 are open and all normal condition checking contacts 89 are closed, the unit may be placed back into service. With these conditions established, the operating coil 91 of the solenoid 93 is energized, which, in turn, closes its contacts 95, locking itself in and energizing the operating coil 97 of the jacking-in solenoid 99 which moves the tank 3 until it closes its limit switch 101 and deenergizes the solenoid 93. A resistor 103 limits the short circuit current while the limit switch 101 is energized.

Figure 4:
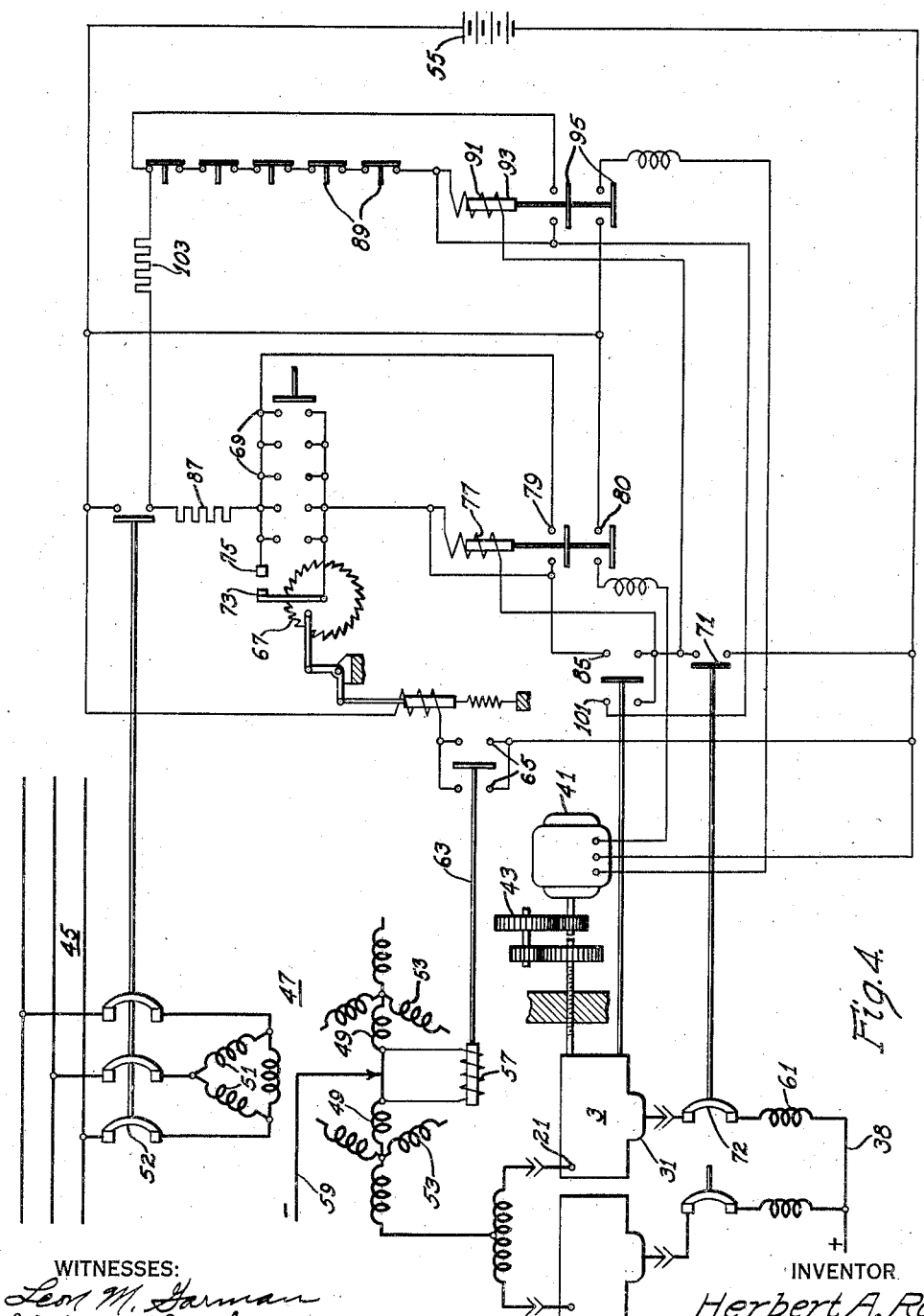

In Fig. 4, I show a control scheme for a motor-driven means in order to remove a faulty section 3 from its operating position. This system of control is similar to that of Fig. 3, except upon the closing of contacts 79 and 80, the motor 41 is placed across the supply circuit 45. Preferably, a combination of gears 43 are used in connection with the motor 41 which moves out the faulty section 3. The limit switches 85 and 101 in this modification of my invention limits the distance the tank 3 moves, as previously described.

It can be readily understood that in the control system I provide, the converter sections 3 are disconnected automatically once the initial contactor 75 is closed, so that manual supervision of the faulty sections is unnecessary.

When any abnormal operative condition arises, such as those previously mentioned, the high speed circuit breaker 72 opens, closing its back contacts 71. The protective circuit becomes energized in response to this condition and operates the solenoid 83 which jacks out the faulty section from service.

While for purposes of illustration, I have shown and described specific embodiments of my invention, it will be apparent that changes and modifications can be made therein without departing from the true spirit of my invention or the scope of the claims.

I claim as my invention:

1. A protective system for a sectionalized vapor-arc converter comprising a plurality of converter sections, a supporting structure for said sections, said converter sections being movably mounted in said structure, contact means for connecting electrical circuits to each of said sections, means for selectively moving each of said sections to render said contact means inoperative and relay means responsive to abnormal operating conditions in any section of said converter for energizing said moving means to disconnect said faulty section.

2. A protective device for a sectionalized vapor-arc converter comprising a plurality of converter sections, a supporting structure for said converter, said converter sections being individually movably mounted in said structure, contact means for connecting electrical circuits to each of said sections, means for selectively disconnecting each of said sections to render said contact means inoperative, means for energizing said moving means in any section of said converter whereby said disconnecting mechanism automatically disengages any section of said converter from said electrical circuits upon indication of fault in any of said sections.

3. A protective device for a sectionalized vapor-arc converter comprising a plurality of converter sections, a plurality of movable means for each of said sections, a supporting frame for said sections, contact means for connecting electrical circuits to each of said sections, means for distinguishing abnormal operating condition in said section, means for selectively moving each of said sections in response to said fault finding means whereby said moving means functions to disconnect the faulty section from service.

4. A protective device for a sectionalized vapor-arc converter comprising a plurality of converter sections, a supporting structure for said sections, said converter sections being movably mounted in said structure, contact means for connecting electrical circuits to each of said sections, disconnecting means for selectively moving each of said sections to render said contact means inoperative and relay means responsive to abnormal operating conditions in any section of said converter for energizing said disconnecting means whereby the faulty section is removed from service without disturbing the vacuum and cooling means and other auxiliary systems associated with said sections.

5. A protective device for a sectionalized vapor-arc converter installation comprising a plurality of converter sections grouped as a unit, supporting structure for said sections, a plurality of rollers mounted to each of said sections, a plurality of rails supported by said supporting structure, said converter sections being movably mounted on said rails, contact means for connecting electrical circuits to each of said sections, means for rendering said contact means inoperative, and relay means responsive to abnormal operating conditions in any section of said converter for automatically disengaging any of said sections from said unit upon fault.

6. In an electrical converting system comprising a plurality of converter sections, a supporting structure for said sections, said converter sections capable of being moved individually in said structure, a motor-driven means including a combination of gears for moving said sections, electrical contacts for connecting said motor-driven means to a source of power, and means functioning in response to abnormal operation conditions for operating said motor-driven means.

7. In an electrical converting system comprising a plurality of converter sections, a supporting structure for said sections, a plurality of movable means for each of said sections, contact means for connecting electrical circuits to each of said sections, a motor-driven means including a gearing combination mechanically associated with said sections, relay means responsive to abnormal operating conditions in any section of said converting system, said motor-driven means being responsive to abnormal conditions in said sections whereby the faulty section is mechanically removed from service.

8. In an electrical converting system comprising a plurality of converter sections, a supporting structure for said section, a plurality of movable means for each of said sections, a motor-driven means mechanically attached to said sections, a relay means including electrical contacts responsive to abnormal operating conditions in any section of said converter, a control means for said motor whereby the direction of rotation of said motor corresponds to the position of said section in said converter.

9. A protective system for a sectionalized vapor-arc converter comprising, in combination, a plurality of converter sections, a supporting structure for said sections, said converter sections being movably mounted in said structure, contact means for connecting an electrical circuit to each of said sections, means for selectively moving each of said sections to render said contact means inoperative and an auxiliary means responsive to abnormal operating conditions in any section of said converter, whereby said auxiliary means operates said moving means to remove the faulty section from service upon occurrence of a number of faults.

HERBERT A. ROSE.